Oct. 9, 1956　　　T. J. DYKZEUL ET AL　　　2,765,803
CONTROL VALVE MECHANISM FOR FLUID
FUEL BURNING APPLIANCES

Filed Oct. 29, 1953　　　　　　　　　　　　2 Sheets-Sheet 1

INVENTORS
Theodore J. Dykzeul and
BY Wilburl.Schmidt.

THEIR ATTORNEY

INVENTORS
Theodore J. Dykzeul and
BY Wilbur L. Schmidt.

THEIR ATTORNEY

Page skipped — patent front matter 2,765,803

CONTROL VALVE MECHANISM FOR FLUID FUEL BURNING APPLIANCES

Theodore J. Dykzeul and Wilbur L. Schmidt, Compton, Calif., assignors to Robertshaw-Fulton Controls Company, Greensburg, Pa., a corporation of Delaware Application October 29, 1953, Serial No. 389,006

7 Claims. (Cl. 137—79)

This invention relates to safety controls for fuel burners and, more particularly, to thermostatic devices for controlling flow of gaseous fuel to water heaters and like appliances.

Appliances of the type indicated have been provided with electrically operated safety valves which are energized by current generated by a thermoelectric device exposed to a flame at a pilot burner. Such safety valves are operable for shutting off the flow of fuel to the main burner of the appliance when the pilot burner is extinguished. Various means have also been provided to render the thermoelectric device incapable of maintaining the safety valve open during the normal operation of the burners if a dangerous condition arises such as excessive temperature or pressure of water being heated by the burners.

An object of the present invention is to combine, in control systems of the character described, safety thermally responsive means responsive to an unusually high temperature of the appliance, that is, a temperature somewhat above the upper limit of the normal operating range, to shut off the flow of fuel to the pilot burner and thereby cause the shutting down of the appliance before a dangerously high temperature is reached. The safety pilot control customarily used with the appliance is thus utilized in a high temperature safety shutoff control.

Another object of the invention is to accomplish the shutoff by operation of the thermoelectric safety valve but independent of the current generated by the thermocouple.

Another object of the invention is to adjust the temperature at which a snap-action device will act to effect closing of a pilot valve.

Another object of the invention is to bias a snap-acting bellows toward its expanded state to provide a fail-safe device and permit adjustment of the bias to set the temperature at which the bellows will actuate a valve.

Another object of the invention is to require manual resetting of the control device after an abnormal temperature condition has caused the same to shut off the flow of fuel to the pilot burner to thereby direct attention of an operator to the existence of such abnormal condition.

In a preferred embodiment of the invention, a valve member for controlling the flow of pilot fuel is disposed between a manually operable reset stem and a thermally responsive snap-action device. Upon the occurrence of a predetermined temperature condition, the snap-action device will move the valve member to its closed position and means is provided to prevent subsequent movement of the valve member to its open position until the manual reset is actuated.

Other objects and advantages will appear from the following specification taken in connection with the accompanying drawings wherein.

Figure 1:
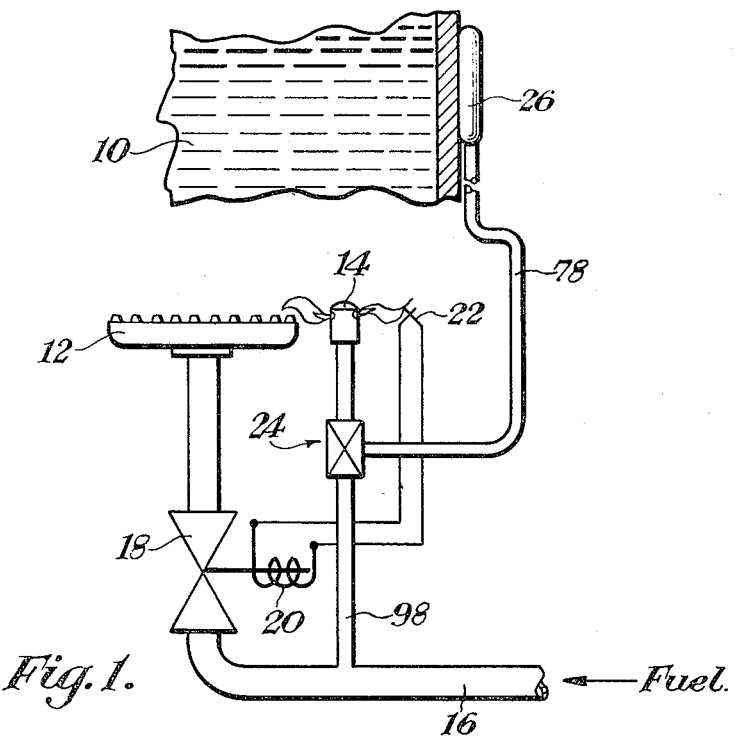
Fig. 1 is a schematic showing of a water heater incorporating the safety control system of the present invention.

Referring more particularly to Fig. 1 of the drawings, the safety control system of the present invention is illustrated in conjunction with a water heater including a storage tank 10 containing water and being heated at its base by a main burner 12 adapted to be ignited by a pilot burner 14. A gas supply conduit 16 is here shown connected to the burner 12 through a pilot safety control valve 18. The unit 18 may be of any one of a number of devices known in the art and functioning in response to the presence of flame at the pilot burner to normally permit fuel flow from the conduit 16 to the burner 12 but operating to prevent such fuel flow in the event of a pilot flame failure.

Although the flame failure shutoff device 18 may be of the type which utilizes bimetallic or expansible fluid flame sensing devices, it is here shown as being of the thermoelectric type which includes an electromagnet 20 connected to a thermocouple 22 and adapted to be energized by the thermocouple 22 when the same is heated by a pilot flame. As long as the thermocouple 22 remains heated and the magnet 20 is energized, the fuel passage through the unit 18 remains open. However, upon pilot flame failure and cooling of the thermocouple 22, the electromagnet 20 is deenergized and the fuel passage through the unit 18 is closed to prevent fuel supply to the main burner. Thermoelectric types of safety valves such as schematically shown herein are shown and described in Eskin et al. Patent 2,603,509, issued July 15, 1952.

Fuel is supplied to the pilot burner 14 through a conduit 98 which communicates with the supply conduit 16, fuel flow in the conduit 98 being under the control of thermally responsive valve mechanism indicated generally by the reference numeral 24 and which includes a temperature sensing bulb 26 disposed in heat transfer relation with the tank 10.

Figure 2:
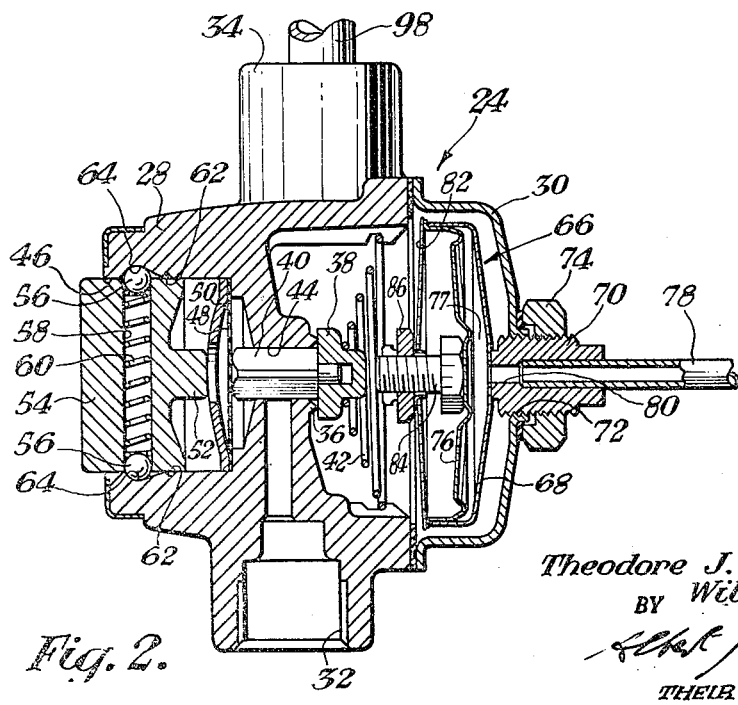
Fig. 2 is a sectional view of a valve mechanism for controlling the flow of pilot fuel in the system shown in Fig. 1 and embodying this invention.
Figure 3:
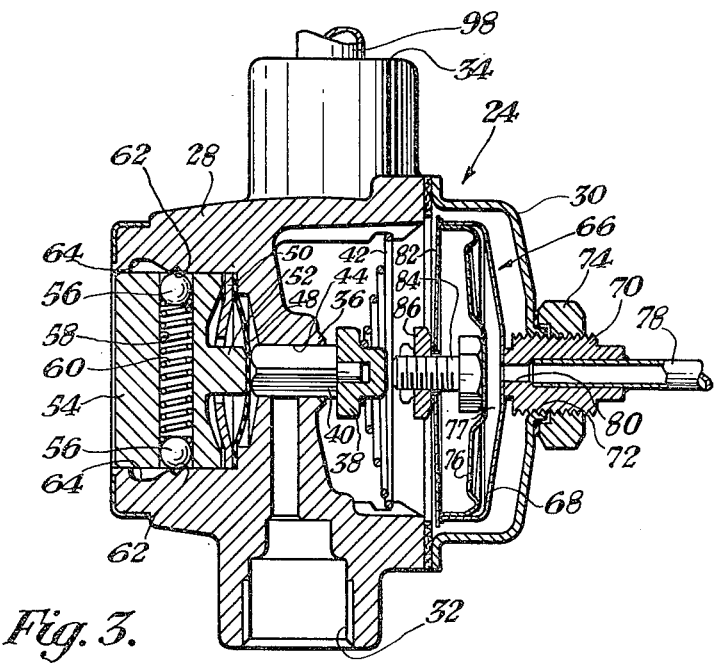
Fig. 3 is a sectional view corresponding to Fig. 2 but showing the various parts of the device in different operating positions.

Referring now more particularly to Figs. 2 and 3 of the drawings, the valve mechanism 24 of this invention comprises a housing formed of two main parts, namely, a valve body 28 having an open end and a cup-shaped closure member 30 which closes the open end of the valve body 28. These parts are suitably bolted or otherwise secured together and sealed against leakage of gaseous fuel from the joints thus formed.

The valve body 28 is adapted for insertion in the conduit 98 by provision of an inlet 32 at one end thereof and an outlet 34 at the opposite end thereof to which the conduit 98 may be threadedly connected. Between the inlet 32 and outlet 34 is a valve seat 36 with which a valve member 38 is adapted to cooperate to control flow of fuel from the inlet 32 to the outlet 34. The valve member 38 is reciprocable toward and away from the seat 36 and is supported by a stem 40 slidably mounted in the valve body 28. The valve member 38 is biased toward the seat 36 by a coil spring 42 acting between the body 28 and the valve member 38.

The valve stem 40 is non-circular in section and is slidably disposed in a circular bore 44 which is formed in a wall of the valve body 28 to define a valve port circumscribed by the valve seat 36 and which communicates with the inlet 32. The end of the valve stem 40 opposite the valve member 38 extends out of the bore 44 into an outwardly opening recess 46 formed in the valve body 28.

To seal the valve body 28 against leakage through the bore 44, a flexible diaphragm 48 extends across the bottom of the recess 46 and is held in sealing relation with the body 28 by a suitable spring retainer 50. The inner face of the diaphragm 48 is engaged by the valve stem 40 and the outer face of the diaphragm 48 is engageable by an abutment 52 formed on a plunger or push button 54 which is slidably mounted in the recess 46.

In the inactive position of the push button 54, as shown in Fig. 2, a portion thereof extends out of the recess 46 to be accessible to a user. When the push button 54 is moved toward the bottom of the recess 46, it moves into engagement with the diaphragm 48 to establish an operative connection with the valve stem 40, further movement of the push button to the position shown in Fig. 3 being effective to move the valve stem 40 to the right as viewed in the drawings with resultant movement of the valve member 38 against the bias of the spring 42 and out of engagement with the valve seat 36.

Yieldable detent means is provided for holding the push button 54 in the depressed or active position as shown in Fig. 3. This means takes the form of a pair of balls 56 loosely mounted in a transverse bore 58 formed in the push button 54. Acting between the balls 56 to bias the same radially outward of the push button 54 is a coil spring 60 which is disposed within the bore 58. A pair of diametrically opposed dwells 62 are formed in the wall of the recess 46 to receive the balls 56 in the depressed position of the push button 54, seating of the balls 56 in the dwells 62 being effective to maintain the push button 54 in the depressed position and hold the valve member 38 in its open position as shown in Fig. 3.

A second pair of diametrically opposed dwells 64 are formed in the wall of the recess 46 to receive the balls 56 in the active position of the push button 54 as shown in Fig. 2. The bottom of each dwell 64 is preferably sloped gradually toward the bottom of the recess 46 to provide cam surfaces cooperable with the balls 56 for camming the push button 54 outward whenever the balls 56 have moved into engagement with said surfaces. The camming action of the dwells 64 and balls 56 thus serves to amplify movement of the push button 54, moving the push button through a distance greater than the distance through which the valve member 38 moves upon closing so that the push button 54 will project a substantial distance out of the recess 46 in the inactive position as shown in Fig. 2. Projection of the push button 54 beyond the outer end face of the valve body 28 thus serves to provide visual indication of the closed condition of the valve member 38 to advise a user that the pilot flame failure has resulted from abnormal temperature conditions.

Mounted within the cup-shaped closure member 30 is a thermally responsive snap-action device indicated generally by the reference numeral 66. This device comprises a first, relatively stiff, cup-shaped member 68 having an axially extending stud 70 secured thereto and threaded through a centrally located aperture 72 formed in the closure member 30. A lock nut 74 is threaded on the stud 70 and serves to clamp the stud relative to the closure member 30.

A second cup-shaped member 76 is nested within the cup-shaped member 68 with its peripheral portion secured thereto by welding or the like. The cup-shaped members 68, 76 define a closed expansible chamber 77 which communicates with the temperature sensing bulb 26 through a capillary tube 78 and an axially extending passage 80 formed in the stud 70 and the cup-shaped member 68. The system comprising the chamber 77, capillary tube 78 and bulb 26 is charged with a suitable thermal fluid which will increase the pressure within the chamber 77 upon an increase in temperature at the bulb 26 to cause expansion of the chamber 77 in a manner well known in the art.

The cup-shaped member 76 is made of a flexible material and the bottom wall thereof is normally somewhat conical with radial corrugations stamped therein. With this construction, increase of pressure within the chamber 77 first moves the end wall of the cup-shaped member 76 away from the member 68, the end wall of the member 76 first assuming a generally planar shape and subsequently passing into the shape of a cone with the apex extending in a direction opposite to that of the apex of the original shape. Thus, the flexible end wall of the member 76 is first compressed radially slightly and then is put under tension to provide a snap-action movement.

Snap-action diaphragms, such as the end wall of the cup-shaped member 76, require a predetermined force to snap the same over center, the magnitude of such force depending upon a number of physical factors such as the diameter, thickness, and dish height of the disk. The force necessary to move the member 76 from the position shown in Fig. 3 to the position shown in Fig. 2 will be produced by pressure within the chamber 76 resulting from the sensing of a predetermined temperature by the bulb 26.

To reduce the temperature at which the member 76 will snap over center, means is provided for biasing the member 76 in a direction to expand the chamber 77. This means takes the form of a leaf spring 82, the outer portions of which are seated on the edges of the cup-shaped member 68, 76 and the central portion of which is apertured to receive a stud 84 which is secured by welding or the like to the center of the bottom wall of the cup-shaped member 76. A nut 86 is threaded on the stud 84 and provides adjustable abutment means against which the leaf spring 82 bears. The leaf spring 82 serves to bias the bottom wall of the cup-shaped member 76 toward the leaf as viewed in Figs. 2 and 3 and therefore exerts a force on the member 76 which complements the force resulting from pressure within the chamber 77. It will be apparent that by adjusting the nut 86 axially of the stud 84, the bias of the leaf spring 82 will be varied to vary the pressure which must be developed within the chamber 77 to produce over center snapping of the bottom wall of the member 76 and thus the nut 86 may be utilized to effectively set the temperature, as sensed by the bulb 26, at which the member 76 will snap over center.

The chamber 77, capillary tube 78 and bulb 26 are preferably charged at a pressure less than atmospheric so that in the event of a leak in the system, the pressure in the chamber will rise to atmospheric pressure and produce over center snapping of the bottom wall of the member 76. Thus, failure of the temperature responsive device 66 will produce a control action identical to that produced by an abnormal temperature condition and the device will fail safe.

In operation, when the various parts of the valve mechanism 24 are in the positions shown in Fig. 2 with the valve member 38 seated on the valve seat 36, no fuel can flow to the pilot burner 14. Before the system may be placed in operation, the water in the tank 10 must cool sufficiently to cause cooling of the bulb 26 and contraction of the chamber 77. The push button 54 may then be depressed to move the valve stem 40 and valve member 38 to the right as viewed in Figs. 2 and 3 against the bias of the spring 42. When the push button 54 is depressed sufficiently, the balls 56 will drop into the dwells 62 to latch the push button 54 in its innermost position where it will remain in contact with the diaphragm 48 and in operative engagement with the valve stem 40 to hold the valve member 38 in its open position. The various parts of the valve mechanism 24 are then in the positions shown in Fig. 3.

Fuel will then flow to the pilot burner 14 where it may be ignited to produce a flame which will heat the thermocouple 22 and cause energization of the electromagnet winding 20. The safety valve 18 may then be opened to permit fuel flow to the main burner 12 and it will be held in fuel flow permitting position by the energized electromagnet coil 20.

In the event the water within the tank 10 rises to the abnormally high temperature at which the thermally responsive snap-action device 66 is set to be actuated, the thermal fluid within the bulb 26 will create a pressure within the chamber 77 sufficient to produce a force which, in conjunction with the bias of the leaf spring 82, is sufficient to cause overcenter snap-action of the bottom wall of the cup-shaped member 76. Such movement of the bottom wall of the member 76 will move the valve member 38, valve stem 40 and push button 54 to the left as viewed in Figs. 2 and 3, moving the balls 56 out of the dwells 62 and into the dwells 64. The push button 54 will then be cammed to its outermost position as shown in Fig. 2 and the valve element 38 will be permitted to move into engagement with the valve seat 36 under the bias of the spring 42.

Such movement of the valve member 38 to its closed position will terminate fuel flow to the pilot burner 14 and extinguish the flame at the same so that the thermocouple 22 will cool and de-energize the electromagnet coil 20. The safety valve 18 will then close to terminate fuel flow to the main burner 12. The valve member 38 will be held in engagement with the seat 36 by the spring 42 and will remain in its closed position until reset by manual manipulation of the push button 54 regardless of cooling of the water within the tank 10 and contraction of the chamber 77. It is to be noted that since the setting of the valve mechanism by a user is necessary to restore the system to operation, a user's attention is directed to the fact that abnormal temperature conditions existed prior to fuel shutoff. Furthermore, movement of the plunger 54 to the outermost position as shown in Fig. 2 upon operation of the valve mechanism 24, provides a visual indication of the existence of abnormal temperature conditions in the appliance.

Figure 4:
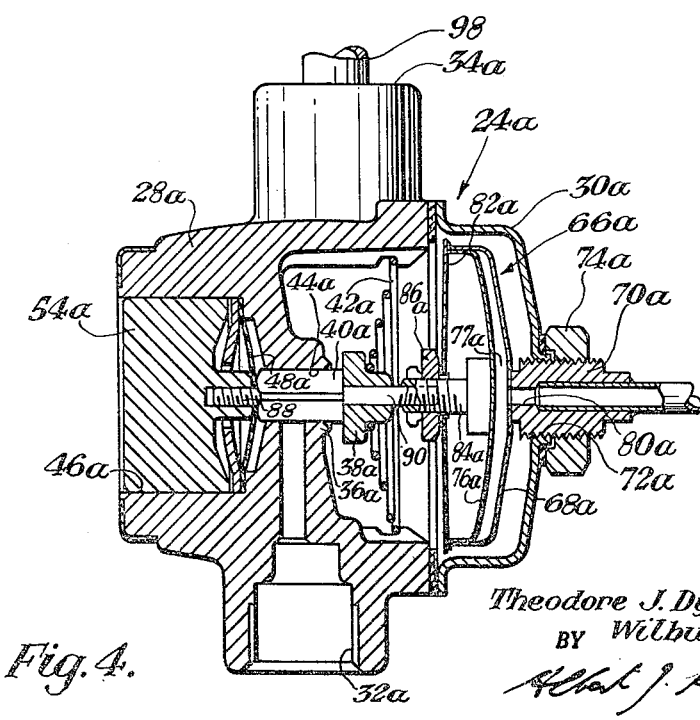
Fig. 4 is a sectional view of a modified form of a valve mechanism for controlling flow of pilot fuel in the system shown in Fig. 1 and comprising another embodiment of this invention.

The embodiment of the invention shown in Fig. 4, wherein reference numerals designating parts hereinbefore described are designated by similar reference numerals having the suffix "a," is similar to that shown in Figs. 2 and 3 but differs in that the push button 54a, valve stem 40a and stud 84a are secured together to move as a unit and the cup-shaped snap-acting element 76a is proportioned to be non self-returning.

Non self-returning snap-action devices are well known in the art and include an over center snap element which is movable from a first to a second position when an outside force of predetermined magnitude is applied thereto in one direction and is movable from the second back to the first position only when an outside force of predetermined magnitude is applied thereto in an opposite direction. With this type of snap-acting device, the yieldable detent means of the embodiment of Figs. 2 and 3 may be dispensed with and the thermally responsive snap-acting device 66a may be utilized to hold the valve member 38a in the open position or in the closed position.

To permit the snap-acting device 66a to so operate, the valve stem 40a is provided with reduced end portions 88, 90. The end portion 88 of the valve stem 40a extends through the diaphragm 48a and is threaded into a suitable tapped sole formed in the push button 54a. The end portion 90 extends slidably through the valve member 38a and is threaded into a suitable tapped hole formed in the stud 84a. Thus the push button 54a, valve stem 40a, valve member 38a, stud 84a, and cup-shaped member 76a of the thermally responsive snap-acting device 66a will move as a unit.

When the various parts of the device are positioned as shown in Fig. 4, the snap-acting device 66a will retain the valve member 38a in open position and the push button 54a in its innermost position. However, upon the occurrence of an abnormal temperature condition, the pressure within the chamber 77a will be increased until the force exerted thereby on the bottom wall of the cup-shaped member 76a is sufficient to snap the same over center, moving the valve member 38a into engagement with the valve seat 36a and moving the push button 54a to its outermost position whereit extends out of the recess 46a to be accessible to a user for the manual resetting operation. When the push button 54a is depressed during resetting, a force is applied to the cup-shaped member 76a to cause the same to snap back to its original position and move the valve member 38a to its open position.

It will be understood that many changes may be made in the arrangement and combination of parts and in the details of construction herein disclosed within the scope of the appended claims without departing from the invention.

It is claimed and desired to secure by Letters Patent:

1. Valve mechanism comprising a casing having a passageway therethrough including a valve port, a valve member movable between open and closed positions relative to said port for controlling flow through the same, snap-action means including a movable actuating element operatively associated with said valve member for moving the same from said open to said closed position when said actuating element moves from a first to a second position, said actuating element being movable from said first to said second position when a force of predetermined magnitude is applied to said snap-action means in one direction, thermally responsive means for applying said predetermined force to said snap-action means in said one direction for moving said actuating element to said second position, means manually operable in another direction for moving said valve member to said open position, and means operable for exerting a predetermined force on said valve member for retaining said valve member in said open position, said last named force being sufficient to render said retaining means operable only as long as said actuating element is in said first position.

2. Valve mechanism as claimed in claim 1 wherein adjustable means is provided for applying a variable force to said snap-action means in said one direction of a magnitude less than said predetermined force.

3. Valve mechanism comprising a casing having a passageway therethrough including a valve port, a valve member movable between open and closed positions relative to said port for controlling flow through the same and being biased toward said closed position, snap-action means including a movable actuating element operatively associated with said valve member for engaging the same when said actuating element moves from a first toward a second position, said actuating element being movable from said first to said second position when a force of predetermined magnitude is applied to said snap-action means in one direction, manually operable means for moving said valve member to said open position, yieldable detent means for holding said valve member in said open position, and thermally responsive means for applying a force to said snap-action means in said one direction for moving said actuating element to said second position to overcome said detent means and permit said valve member to move to said closed position under said bias.

4. Valve mechanism as claimed in claim 3 wherein adjustable means is provided for applying a variable force to said snap-action means in said one direction of a magnitude less than said predetermined force.

5. Valve mechanism as claimed in claim 3 wherein said manually operable means includes a plunger operatively associated with said valve member and operable from a first to a second position for moving said valve member to said open position, said yieldable detent means being operatively associated with said plunger for retaining the same in said second position to hold said valve member in said open position.

6. A snap-action device comprising a dished disk adapted to snap over center when a force of predetermined magnitude is applied to one side thereof, a second dished disk secured at its periphery to the periphery of the first said disk to define a fluid tight expansible chamber, a fluid at less than atmospheric pressure in said chamber, means for varying the pressure in said chamber, yieldable means carried on the peripheries of said disks and extending to the median portion thereof for biasing said first disk in a direction to expand said chamber, the biasing force of said means being less than said predetermined force, and adjustable means operable on the median portion of said yieldable means for varying said bias and the force necessary to snap said disk over center, said yieldable means being operable to expand said chamber in conjunction with atmospheric pressures therein to produce fail safe operation upon leakage of said fluid.

7. Valve mechanism comprising a casing having a passageway therethrough including a valve port, a valve member movable between open and closed positions relative to said port for controlling flow through the same, snap action means including a movable actuating element operatively associated with said valve member for moving the same from said open to said closed position when said actuating element moves from a first to a second position, said actuating element being movable from said first to said second position when a force of predetermined magnitude is applied to said snap action means, thermally responsive means for applying a force to said snap action means for moving said actuating element to said second position, adjustable means for applying a variable force to said snap action means of a magnitude less than said predetermined force, manually operable means for moving said valve member to said open position, and means for retaining said valve member in said open position as long as said actuating element is in said first position.

References Cited in the file of this patent

UNITED STATES PATENTS

| | | |
|---|---|---|
| 928,459 | Kieselhorst | July 20, 1909 |
| 1,206,469 | Rockwell | Nov. 28, 1916 |
| 1,665,719 | Schnepp | Apr. 10, 1928 |
| 1,773,698 | Spencer | Aug. 19, 1930 |
| 1,781,287 | Levy | Nov. 11, 1930 |
| 1,892,344 | Huber | Dec. 27, 1932 |
| 2,070,661 | Hughes | Feb. 16, 1937 |
| 2,142,903 | King | Jan. 3, 1939 |
| 2,455,542 | Weber | Dec. 7, 1948 |
| 2,501,185 | Moorhead | Mar. 21, 1950 |
| 2,521,891 | Beams | Sept. 12, 1950 |
| 2,670,005 | Biermann | Feb. 23, 1954 |
| 2,679,263 | Kiser | May 25, 1954 |

FOREIGN PATENTS

| | | |
|---|---|---|
| 82,663 | Sweden | Feb. 19, 1935 |
| 485,908 | Great Britain | May 26, 1938 |